(12) United States Patent
Salek et al.

(10) Patent No.: US 7,217,768 B2
(45) Date of Patent: May 15, 2007

(54) PAINTABLE, IN-REACTOR BLENDED, THERMOPLASTIC POLYOLEFIN

(75) Inventors: Jeff S. Salek, Oakdale, PA (US); Kimberly M. McLoughlin, Gibsonia, PA (US); Dan Rosenthal, West Chester, PA (US); Andrew Schnitgen, Cranberry, PA (US)

(73) Assignee: Sunoco, Inc. (R&M), Philadelphia, PA (US)

( * ) Notice: Subject to any disclaimer, the term of this patent is extended or adjusted under 35 U.S.C. 154(b) by 315 days.

(21) Appl. No.: 10/953,376

(22) Filed: Sep. 29, 2004

(65) Prior Publication Data

US 2005/0075458 A1  Apr. 7, 2005

Related U.S. Application Data

(60) Provisional application No. 60/508,147, filed on Sep. 30, 2003.

(51) Int. Cl.
  C08F 6/00 (2006.01)
  C08F 2/00 (2006.01)
  C08L 23/00 (2006.01)
(52) U.S. Cl. .................... 525/192; 525/240
(58) Field of Classification Search ............. 525/192, 525/240
  See application file for complete search history.

(56) References Cited

U.S. PATENT DOCUMENTS

| | | | |
|---|---|---|---|
| 5,258,464 A | 11/1993 | McCullough, Jr. et al. | |
| 6,166,139 A | 12/2000 | Ryntz | 525/191 |
| 6,284,833 B1 | 9/2001 | Ford et al. | |
| 6,294,611 B1 * | 9/2001 | Takayanagi et al. | 525/191 |
| 6,399,707 B1 | 6/2002 | Meka et al. | |
| 2005/0234196 A1 * | 10/2005 | Kim et al. | 525/191 |

FOREIGN PATENT DOCUMENTS

| | | |
|---|---|---|
| EP | 0 574 114 A1 | 12/1993 |
| EP | 1 086 986 A1 | 3/2001 |
| JP | 19910079964 | 5/1991 |

OTHER PUBLICATIONS

R. A. Rintz et. al, "Measuring Adhesion to Poly(olefins): The Role of Adhesion Promoter and Substrate." Journal of Coatings Technology, 2001 vol. 73, No. 921, pp. 107-115.

F.M. Mirabella et. al., Theoretical Analysis and Experimental Characterization of the TPO/Adhesion Promoter/Paint Interface of Painted Thermoplastic Polyolefins (TPO) SPE Automotive Global Conference, Sep. 20-22, 1999.

R. A. Ryntz, et. al., Effects of Coating Solvents on the Morphology of Thermoplastic Polyolefins (TPO) Journal of Coatings Technology, vol. 67, No. 843, Apr. 1995, pp. 45-55.

James T. Luce, "Improved Performance in Exterior Automotive TPO" Fifth International TPOs in Automotive Conference, Novi, MI, 1998.

P. Solera, et. al., "Advances in Stabilization Systems for Paintable and Molded-In Color TPO's" Fifth International TPOs in Automotive Conference, Novi, MI, 1998.

E. Tomasetti, et. al., "Surface Characterization of Polypropylene/ (Ethylene-Propylene) Copolymer Blends (PP/EP): Application to Injected-moulded Systems" Surface and Interface Analysis, vol. 27, 1999, pp. 735-742.

E. Tomasetti et. al., "Diffusion of adhesion promoter (CPO) into polypropylene / ethylene—propylene (PP-EP) copolymer blends: mechanism" Journal of Adhesion Science and Technology, vol. 15, No. 13, (2001) pp. 1589-1600.

A. K. Ford and M. G. Reichamnn, "High Stiffness, Ductile, and Paintable Materials for Automotive Bumper Fascia" Seventh Annual TPOs in Automotive Conference, Novi, MI, 2000.

C. Metaxas and M. Reichmann, Reaactor TPOs: Myths, misconceptions, and microscopy 2nd SPE Automotive TPO Global Conference, Dearborn, MI, Oct. 2-4, 2000.

T. Ellis, "Interaction of Chlorinated Polyolefins with Ethylene-Propylene Copolymers and their Relevance to Painted TPOs" Polymer Engineering and Science, vol. 41, No. 12, 2001, pp. 2065-2072.

* cited by examiner

Primary Examiner—Nathan M. Nutter
(74) Attorney, Agent, or Firm—Robert A. Koons, Jr.; Matthew P. McWilliams; Drinker Biddle & Reath LLP

(57) ABSTRACT

A paintable impact copolymer composition is produced by in-reactor blending of a xylene insoluble polypropylene fraction and a xylene soluble ethylene-propylene rubber (EPR) fraction. The composition comprises from about 5 wt. % to about 50 wt. % a xylene-soluble portion and from about 50 wt. % to about 95 wt. % a xylene-insoluble portion. The ratio of the weight average molecular weight of said xylene-soluble portion to that of said xylene-insoluble portion is from about 0.5 to about 1.8. The intrinsic viscosity of said xylene-soluble portion is from about 0.5 to about 7.0 dL/g. The xylene-soluble portion comprises from about 30 to about 70 mole percent ethylene units.

13 Claims, No Drawings

PAINTABLE, IN-REACTOR BLENDED, THERMOPLASTIC POLYOLEFIN

RELATED APPLICATIONS

This application claims priority to provisional application Ser. No. 60/508,147 filed on Sep. 30, 2003, the contents of which are incorporated herein by reference in their entirety.

FIELD OF THE INVENTION

This invention is in the field of impact copolymers (ICP's), and more specifically thermoplastic polyolefins. The invention is further directed to thermoplastic polyolefins having good paint adhesion when molded into articles of manufacture.

BACKGROUND OF THE INVENTION

There is a growing interest in ICP's with good paint adhesion properties, in particular in the automotive industry for items such as bumper fascia. These materials must have mechanical properties appropriate to their use, such as high flexural modulus, high Izod impact energy, sufficient low-temperature impact energy and ductility, and acceptable elongation at break. They often must also be paintable in order to ensure a pleasing appearance of the entire product incorporating them. In the case of an automobile bumper, for example, the bumper and the rest of the car's exterior must be matched in color. "Paintable" in this context means that paint must adhere well to the polymer.

Paintability and mechanical properties tend to be in opposition: those compositional properties that tend to make an ICP paintable do not usually tend to give it desirable mechanical properties, and vice-versa. For example, a relatively high concentration of amorphous ethylene-propylene rubber having a low intrinsic viscosity is believed to enhance paintability but reduce stiffness. The present invention includes an impact copolymer composition and method for making the composition. Articles molded using the composition achieve a good balance between the requirements of paintability and mechanical properties.

BRIEF DESCRIPTION OF THE INVENTION

The invention is a paintable impact copolymer composition produced by in-reactor blending. The composition comprises from about 5 wt. % to about 50 wt. % of a xylene-soluble portion and from about 50 wt. % to about 95 wt. % a xylene-insoluble portion. The ratio of the weight average molecular weight of the xylene-soluble portion to that of the xylene-insoluble portion is from about 0.5 to about 1.8. The intrinsic viscosity of said xylene-soluble portion is from about 0.5 to about 7.0 dL/g. The xylene-soluble portion comprises from about 30 to about 70 mole percent ethylene units. The composition according to the current invention has a melt flow rate of about 0.5 dg/min to about 200 dg/min. Additionally, the melt flow rate of the composition according to the current invention may be adjusted by controlled rheology techniques.

DETAILED DESCRIPTION OF THE INVENTION

What follows are descriptions of several embodiments of the invention, which are not to be construed as limiting.

The invention comprises a thermoplastic polyolefin composition. More specifically, the invention comprises an impact copolymer in which a polypropylene homopolymer (HPP) component and an ethylene-propylene rubber (EPR) component are blended in-reactor. In-reactor blending differs from compounding, in which the components are physically blended outside of their respective reactors, and provides a greater degree of control over the reactions and the structure and properties of the copolymer. Molded articles manufactured with the composition of this invention display improved paintability and also possess mechanical properties established in the art as desirable for impact copolymers in a wide variety of uses.

Paintability is understood in the art to mean exhibiting a high degree of paint adhesion, as measured in various adhesion tests. A paint peel test was used to evaluate various samples, prepared under a variety of conditions, as explained below. Some of the samples tested exhibited cohesive failure, meaning that the paint adhered strongly to the rubber component of the impact copolymer and tore the rubber upon being peeled. These samples were regarded as passing the paintability test.

Desirable mechanical properties for uses such as bumper fascia for automobiles are understood in the art to include high flexural modulus, non-break Izod, low-temperature ductility, low after-bake shrinkage, and high resin melt flow rate (MFR). High MFR is desirable in order to facilitate the molding of the composition into articles of manufacture.

A variety of impact copolymer samples were fabricated under different controlled processing conditions selected to bring about desired properties of the two components and the overall compositions. These samples were tested for paintability and mechanical properties. In addition, the EPR and HPP components of each sample were separately characterized. The two components were separated by xylene solubility, a well-established technique in the art. To a large extent, the xylene-soluble (XS) portion of each composition is the EPR, with a relatively small admixture of amorphous polypropylene from the HPP continuous phase. The xylene-insoluble (XIS) portion is predominantly the (mostly isotactic) HPP continuous phase, with a mixture of insoluble ethylene-containing species.

Although it is impossible to decouple the effects of all of the ICP properties that contribute to paint adhesion, several trends are observed. Among the materials studied here, the best paint performance was obtained for materials with relatively high EPR concentration and low EPR molecular weight. The molecular weight of the EPR phase appears to dominate performance. Paint performance also correlates well with the ratio of Mw of the xylene-soluble component to the Mw of the xylene-insoluble component. Good paint adhesion has been observed for materials that contain some crystalline, blocky PE in the xylene-insoluble component.

Table I summarizes data on physical properties, and paintability, obtained with various samples. All samples were ductile at −30° C.

TABLE I

| Sample | Powder MFI | Pellet MFI | Flex-Sec Mod 1% psi | Izod ft.lb./in. | Total Energy IIMP @ −50° C. ft.-lb. | Rockwell Hardness | Paintability test |
|---|---|---|---|---|---|---|---|
| 1 | 4.6 | 10 | 117669 | Non-break | 34.2 | 49.8 | Pass |

TABLE I-continued

| Sample | Powder MFI | Pellet MFI | Flex-Sec Mod 1% psi | Izod ft.lb./in. | Total Energy IIMP @ −50° C. ft.-lb. | Rockwell Hardness | Paintability test |
|---|---|---|---|---|---|---|---|
| 2 | 1.8 | 12 | 130395 | 2.22 | 34.6 | 58.3 | Pass |
| 3 | 1.8 | 12 | 131703 | 2.76 | | 60.3 | Pass |
| 4 | 20 | 20 | 146500 | Non-break | | | Fail |
| 5 | 6 | 6 | 129017 | Non-break | | | Pass |
| 6 | 6 | 22 | 117850 | Non-break | | 58.4 | Pass |
| 7 | 35 | 36 | 117395 | 2.4 | | 28.4 | Pass |

Table II summarizes data on EPR (XS) concentrations and molecular weights, and XIS molecular weights. Table III summarizes data on the ethylene groupings within the XS and XIS components, and copolymer crystallinity.

TABLE II

| Sample | Wt. % XS in copolymer | Mw of XS kD | Mw of XIS kD | Ratio Mw (XS)/Mw (XIS) | Paintability test |
|---|---|---|---|---|---|
| 1 | 21.6 | 154 | 169 | 0.91 | Pass |
| 2 | 19.5 | 171 | 183 | 0.93 | Pass |
| 3 | 16.9 | 155 | 194 | 0.80 | Pass |
| 4 | 22.5 | 296 | 151 | 1.96 | Fail |
| 5 | 27.1 | 276 | 209 | 1.32 | Pass |
| 6 | 27.9 | 191 | 159 | 1.20 | Pass |
| 7 | 32.3 | 197 | 130 | 1.52 | Pass |

TABLE III

| Sample | Mol % XS EEE | Mol % XIS EEE | Copolymer crystallinity, DSC[1] % | Copolymer crystallinity, XRD[2] % | Paintability test |
|---|---|---|---|---|---|
| 1 | 19.93 | 9.79 | 40.9 | | Pass |
| 2 | 24.91 | 14.42 | 40.1 | 48.9 | Pass |
| 3 | 22.21 | 12.23 | 43.7 | 49.6 | Pass |
| 4 | 22.10 | 7.26 | 45 | | Fail |
| 5 | 10.70 | 0.88 | 43.5 | | Pass |
| 6 | 10.64 | 0.71 | 43.5 | | Pass |
| 7 | 9.64 | 0.00 | 39.7 | | Pass |

[1]Differential scanning calorimetry
[2]X-ray diffraction

The best balance of paintability and mechanical properties is achieved with compositions within the following ranges. The xylene-soluble portion is 5–50% by weight of the composition, preferably 10–30 wt. %, and more preferably 15–25 wt. %. The total ethylene content in the composition is 5–30 wt. %, preferably 10–20 wt. %, and more preferably 14–17 wt. %. As a measure of the ethylene concentration in the EPR, the concentration of $C_2$ in the XS portion is 30–70 mol %, preferably 40–60 mol %, and more preferably 45–55 mol %.

The ethylene in the EPR is relatively "blocky", meaning that ethylene triads (three consecutive ethylene monomer units, EEE) occurred significantly more often than would have occurred if the ethylene and propylene units were incorporated randomly into the chains. Specifically, the XS portion contained 5–40 mol % ethylene triads, preferably 10–30 mol %, and more preferably 15–25 mol %, as measured by $^{13}C$ NMR. This excess of ethylene triads enhances the formation of islands of crystalline polyethylene homopolymer within the EPR particles and, to a lesser extent, in the HPP after blending.

The paintability of a molded article of impact copolymer is affected by the morphology of the rubber particles at the surface of the molded material. This morphology is in turn affected by the rheology of the copolymer-forming reactions. For this purpose, the rheology is characterized by the ratio of intrinsic viscosity of the EPR to that of the polypropylene homopolymer. This ratio can be correlated with the ratio of the weight-average molecular weight Mw of the XS portion to that of the XIS portion. In the present invention, the best balance of paintability and mechanical properties is achieved with this Mw ratio in the range 0.5–1.8, preferably 0.8–1.6, and more preferably 0.9 to 1.3. In addition, the best balance of paintability and mechanical properties is achieved with the intrinsic viscosity of the XS portion in the range 0.5–7.0 dL/g, preferably 1.0–3.0 dL/g, and more preferably 1.2–1.6 dL/g.

The melt flow rate (MFR) of the composition should be 0.5–200 g/10 minutes, preferably 5–50 g/10 minutes, and more preferably 10–15 g/10 minutes. The melt flow rate can be adjusted during molding using established techniques known as controlled rheology. Controlled rheology is understood in the art to mean the addition to the melt of substances such as alkyl peroxides, resulting in controlled degradation of the polymer and melt flow rates, as well as narrower molecular weight distributions. Alternatively, with different values for the composition variables within the ranges stated above, it may be possible to make paintable compositions having the desired mechanical properties without the use of controlled rheology. Likewise, the fabrication of paintable, mechanically acceptable compositions other than those fabricated to date may be possible with different values for the process variables within the stated ranges.

The paintability of ICP's can be adversely affected by additives, which migrate or "bloom" to the surface of the molded article. These additives include antiblocks, antistats, slip agents, lubricants, and acid scavengers. Accordingly, the compositions of this invention were fabricated with minimal effective concentrations of these additives.

Compositions according to the current invention are impact copolymers displaying enhanced paintability. The compositions comprise a polypropylene homopolymer with a relatively high degree of crystallinity and an ethylene-rich ethylene-propylene rubber with a relatively high degree of blockiness and crystallinity among the ethylene units. Articles manufactured from these compositions, for which the paintability and mechanical properties would be highly advantageous, include bumper fascia, deflectors, shields, cladding, and cowls, for automobiles.

It is to be understood that the descriptions and embodiments described above are exemplary, and are not to be taken as limiting the scope of the invention. Alternatives, modifications, and variations, which do not depart from the spirit and scope of this invention, will be apparent to those skilled in the art. The scope of this invention is to be defined by the following claims:

What is claimed is:
1. A paintable impact copolymer composition comprising:
 a continuous phase comprising a propylene homopolymer and a discontinuous phase comprising an ethylene-propylene rubber;
 said impact copolymer composition having from about 5 wt. % to about 50 wt. % of a xylene-soluble portion and from about 50 wt. % to about 95 wt. % of a xylene-insoluble portion; wherein the ratio of the weight average molecular weight of said xylene-soluble portion to that of said xylene-insoluble portion is from about 0.5 to about 1.8;

the intrinsic viscosity of said xylene-soluble portion is from about 0.5 to about 7.0 dL/g; and said xylene-soluble portion comprising from about 30 to about 70 mole percent ethylene units;

wherein from about 5 to about 40 mole percent of said ethylene units in said xylene-soluble portion exist in triads;

said impact copolymer composition being produced by in-reactor blending.

2. The composition of claim 1, wherein the ratio of the weight average molecular weight of said xylene-soluble portion to that of said xylene-insoluble portion is from about 0.8 to about 1.6.

3. The composition of claim 1, wherein the ratio of the weight average molecular weight of said xylene-soluble portion to that of said xylene-insoluble portion is from about 0.9 to about 1.3.

4. The composition of claim 1, wherein the intrinsic viscosity of said xylene-soluble portion is from about 1.0 to about 3.0 dL/g.

5. The composition of claim 1, wherein the intrinsic viscosity of said xylene-soluble portion is from about 1.2 to about 1.6 dL/g.

6. The composition of claim 1, wherein said xylene-soluble portion comprises from about 40 to about 60 mole percent ethylene units.

7. The composition of claim 1, wherein said xylene-soluble portion comprises from about 45 to about 55 mole percent ethylene units.

8. The composition of claim 1, wherein from about 10 to about 30 mole percent of said ethylene units exist in triads.

9. The composition of claim 8, wherein from about 15 to about 25 mole percent of said ethylene units exist in triads.

10. The composition of claim 1, wherein said composition has a melt flow rate in the range of 0.5 to 200 dg/min.

11. The composition of claim 10, wherein the melt flow rate of said composition has been adjusted by controlled rheology.

12. The composition of claim 1, wherein said composition comprises from about 10 wt. % to about 30 wt. % of a xylene-soluble portion and from about 70 wt. % to about 90 wt. % of a xylene-insoluble portion.

13. The composition of claim 12, wherein said composition comprises from about 15 wt. % to about 25 wt. % of a xylene-soluble portion and from about 75 wt. % to about 85 wt. % of a xylene-insoluble portion.

* * * * *